(12) United States Patent
Fukuda

(10) Patent No.: US 12,404,429 B2
(45) Date of Patent: Sep. 2, 2025

(54) PROTECTIVE FILM

(71) Applicant: LINTEC Corporation, Tokyo (JP)

(72) Inventor: Daiki Fukuda, Tokyo (JP)

(73) Assignee: LINTEC Corporation, Tokyo (JP)

( * ) Notice: Subject to any disclaimer, the term of this patent is extended or adjusted under 35 U.S.C. 154(b) by 106 days.

(21) Appl. No.: 18/124,142

(22) Filed: Mar. 21, 2023

(65) Prior Publication Data

US 2023/0303893 A1    Sep. 28, 2023

(30) Foreign Application Priority Data

Mar. 28, 2022 (JP) ................... 2022-052063

(51) Int. Cl.
*C09J 7/40* (2018.01)
*B32B 7/12* (2006.01)
(Continued)

(52) U.S. Cl.
CPC .................. *C09J 7/403* (2018.01); *B32B 7/12* (2013.01); *B32B 27/304* (2013.01); *B32B 27/40* (2013.01); *C09J 5/00* (2013.01); *C09J 7/203* (2018.01); *C09J 7/245* (2018.01); *C09J 7/25* (2018.01); *C09J 7/38* (2018.01); *B32B 27/08* (2013.01); *B32B 27/20* (2013.01); *B32B 27/32* (2013.01); *B32B 27/36* (2013.01); *B32B 2250/24* (2013.01); *B32B 2255/10* (2013.01);
(Continued)

(58) Field of Classification Search
CPC ..... C09J 7/403; C09J 5/00; C09J 7/203; C09J 7/245; C09J 7/25; C09J 7/38; C09J 2203/326; C09J 2301/302; C09J 2427/006; C09J 2475/006; C09J 2203/318; C09J 7/405; B32B 7/12; B32B 27/304; B32B 27/40; B32B 27/08; B32B 27/20; B32B 27/32; B32B 27/36; B32B 2250/24; B32B 2255/10; B32B 2255/26; B32B 2307/518; B32B 2307/54; B32B 2307/7376; B32B 2307/748; B32B 2405/00; B32B 2307/4026; B32B 2307/4023; B32B 2457/20; B32B 2571/00; G02F 1/133331; G02F 2202/28; G02F 2201/50

See application file for complete search history.

(56) References Cited

U.S. PATENT DOCUMENTS 3,565,750 A * 2/1971 Evans .................. C09J 7/22
   428/447
9,120,954 B2 * 9/2015 Feller .................. H05K 13/00
(Continued)

FOREIGN PATENT DOCUMENTS

JP    2013-242567        12/2013
KR    20180096448 A  *  2/2018

OTHER PUBLICATIONS

Machine Translation of KR-20180096448-A. (Year: 2018).*
(Continued)

*Primary Examiner* — Patricia L. Nordmeyer
(74) *Attorney, Agent, or Firm* — Nixon & Vanderhye P.C.

(57) ABSTRACT

A protective film comprising a release liner, a pressure sensitive adhesive layer, and a base material film laminated in this order in a thickness direction thereof, wherein the base material film contains polyurethane or poly(vinyl chloride), and information is printed on an opposite side, of the release liner, from the pressure sensitive adhesive layer.

15 Claims, 11 Drawing Sheets

(51) Int. Cl.
*B32B 27/08* (2006.01)
*B32B 27/30* (2006.01)
*B32B 27/32* (2006.01)
*B32B 27/36* (2006.01)
*B32B 27/40* (2006.01)
*C09J 5/00* (2006.01)
*C09J 7/20* (2018.01)
*C09J 7/24* (2018.01)
*C09J 7/25* (2018.01)
*C09J 7/38* (2018.01)
*B32B 27/20* (2006.01)
*G02F 1/1333* (2006.01)

(52) U.S. Cl.
CPC ..... *B32B 2255/26* (2013.01); *B32B 2307/518* (2013.01); *B32B 2307/54* (2013.01); *B32B 2307/7376* (2023.05); *B32B 2307/748* (2013.01); *B32B 2405/00* (2013.01); *C09J 2203/326* (2013.01); *C09J 2301/302* (2020.08); *C09J 2427/006* (2013.01); *C09J 2475/006* (2013.01); *G02F 1/133331* (2021.01); *G02F 2202/28* (2013.01)

(56) References Cited

U.S. PATENT DOCUMENTS

| | | | |
|---|---|---|---|
| 9,777,195 B2 * | 10/2017 | Colby | B32B 27/283 |
| 10,364,374 B2 * | 7/2019 | Colby | B29C 63/02 |
| 11,111,418 B2 * | 9/2021 | Colby | B32B 27/283 |
| 2004/0246386 A1 * | 12/2004 | Thomas | B32B 7/06 |
| | | | 348/E5.131 |
| 2005/0249946 A1 * | 11/2005 | Hsu | C09J 7/50 |
| | | | 428/354 |
| 2008/0233326 A1 | 9/2008 | Hegemier et al. | |
| 2012/0087072 A1 * | 4/2012 | McGuire | B32B 27/308 |
| | | | 361/679.01 |
| 2013/0029077 A1 * | 1/2013 | Yoon | G06F 3/041 |
| | | | 427/155 |
| 2013/0280463 A1 * | 10/2013 | On | B44C 1/105 |
| | | | 428/38 |
| 2016/0075170 A1 * | 3/2016 | Kleppen | B32B 27/30 |
| | | | 156/60 |

OTHER PUBLICATIONS

Michelman Safety Data Sheet, Classification According to the Regulation OSHA 29 CFR 1910.1200 HCS 2012, for DIGIPRIME 5000, Issuing Date: Jun. 11, 2018, 7 pages.

* cited by examiner

PROTECTIVE FILM

BACKGROUND OF THE INVENTION

Field of the Invention

Priority is claimed on Japanese Patent Application No. 2022-052063, filed Mar. 28, 2022, the content of which is incorporated herein by reference.

The present invention relates to a protective film.

Description of Related Art

In recent years, personal digital assistants, such as smartphones and tablets, have become prevalent rapidly. Many of these personal digital assistants have display screens of touchscreen-type liquid crystal displays. Thus, these personal digital assistants employ a structure, in which a display screen occupies almost entirety of the front face of a body of the device. However, such a liquid crystal display is fragile against impact and is susceptible to a break or damage due to a drop or external impact. Therefore, protective films to protect display panels of personal digital assistants have been widely used.

Patent Document 1 describes a protective film having a PET layer under a reinforced glass film, an adhesive layer for adhering the reinforced glass film and the PET layer, and a tacky layer for attaching the PET layer and a surface of the portable electronic device.

CITATION LIST

Patent Literature

Patent Document 1: JP 2013-242567 A

SUMMARY OF THE INVENTION

In recent years, for example, a smartphone having a curved display, in which the display screen has a curved shape in its end portions, have appeared. However, in a case where a film lacking flexibility, such as the reinforced glass film in Patent Document 1, is used, the protective film does not adequately conform to a display screen.

Meanwhile, for the purpose of product management of a protective film and the like, a tag or label indicating a lot number or a readable code such as a bar code may be attached to the protective film.

However, if the multiple protective films are transported or stored in a form of a stack during distribution and storage, the protective film may develop a mark (hereinafter, referred to as "pressed mark") originated from a difference in heights of tag or label parts. In a case where a protective film has a base material film having high flexibility, the film is susceptible to such a pressed mark.

The present invention was completed to solve the problems describe above, and an object of the present invention is to provide a protective film having high conformability to an adherend surface and preventing occurrence of pressed marks.

The present invention has the following aspects.

(1) A protective film including a release liner, a pressure sensitive adhesive layer, and a base material film laminated in this order in a thickness direction thereof, in which
the base material film contains polyurethane or poly(vinyl chloride), and
information is printed on an opposite side, of the release liner, from the pressure sensitive adhesive layer.

(2) The protective film according to (1) above, further including a surface coating layer on an opposite side, of the base material film, from the pressure sensitive adhesive layer.

(3) The protective film according to (1) or (2) above, where the release liner is whitening-treated.

(4) A protective film including a release liner, a pressure sensitive adhesive layer, a base material film, and a cap film laminated in this order in a thickness direction thereof,
the base material film containing polyurethane or poly(vinyl chloride), in which
the base material film contains polyurethane or poly(vinyl chloride),
the cap film is releasable from the protective film after the release liner has been released and removed from the protective film and the protective film is attached to an adherend, and
information is printed on an opposite side, of the cap film, from the base material film.

(5) The protective film according to (4) above, further including a surface coating layer on an opposite side, of the base material film, from the pressure sensitive adhesive layer, in which the release liner, the pressure sensitive adhesive layer, the base material film, the surface coating layer, and the cap film are laminated in this order in the thickness direction thereof.

(6) The protective film according to (4) or (5) above, in which the release liner is whitening-treated.

(7) The protective film according to any one of (4) to (6) above, further including a primer layer on an opposite side, of the cap film, from the base material film.

(8) The protective film according to any one of (1) to (7) above, in which a total thickness, in which the release liner is not included, is from 110 to 600 µm.

(9) The protective film according to any one of (1) to (8) above, where the release liner is released and removed, and the protective film is adhered to a display screen of a device.

According to the present invention, a protective film having high conformability to an adherend surface and preventing occurrence of pressed marks can be provided.

DETAILED DESCRIPTION OF THE INVENTION

Hereinafter, a protective film according to an embodiment of the present invention will be described.

The protective film according to an embodiment of the present invention can protect a surface of an adherend by being attached to the adherend. The protective film according to the embodiment undergoes release and removal of the release liner in the end and attached to an adherend. In the present specification, a "protective film" may also refer to a protective film in a form where a release liner has been removed.

Protective Film

First Embodiment

The protective film of the present embodiment includes a release liner, a pressure sensitive adhesive layer, and a base material film laminated in this order in a thickness direction thereof, in which the base material film contains polyurethane or poly(vinyl chloride), and information is printed on an opposite side, of the release liner, from the pressure sensitive adhesive layer.

Figure 1:
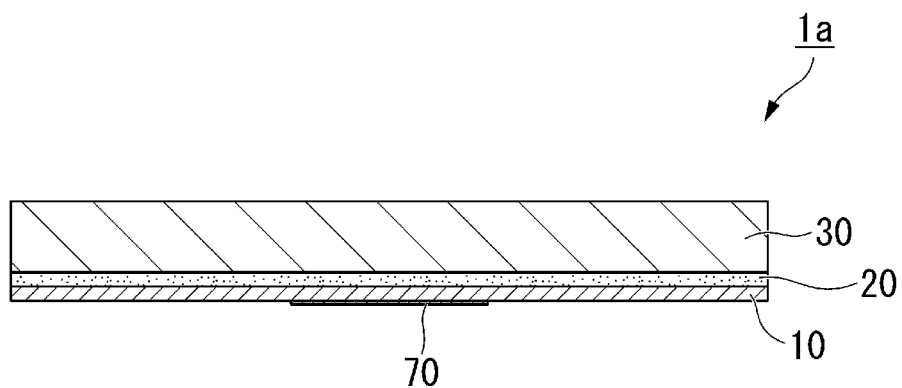
FIG. 1 is a cross-sectional view illustrating an example of a protective film according to an embodiment of the present invention.

FIG. 1 is a cross-sectional view illustrating an example of a protective film according to the present embodiment. As illustrated in FIG. 1, the protective film 1a of the present embodiment includes a release liner 10, a pressure sensitive adhesive layer 20, and a base material film 30 laminated in this order in a thickness direction thereof, and information is printed on an opposite side, of the release liner 10, from the pressure sensitive adhesive layer 20. Note that the printed information is illustrated as a printed layer 70.

Note that "on an opposite side, of the release liner 10, from the pressure sensitive adhesive layer 20" means that the information is printed at a position on a side that is opposite to a side of the pressure sensitive adhesive layer 20 with respect to the release liner 10, and printing is not required to be in a direct contact with the release liner 10.

Figure 7:
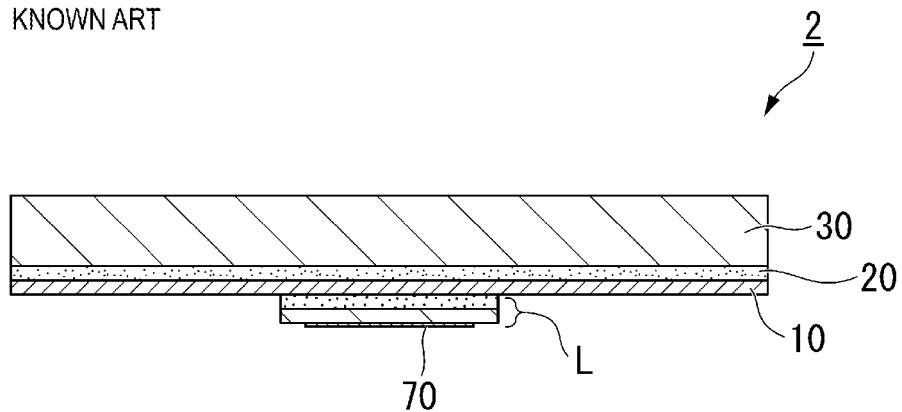
FIG. 7 is a cross-sectional view illustrating an example of a protective film known in the art.

FIG. 7 is a cross-sectional view illustrating an example of a protective film 2 known in the art. On the protective film 2, a label L to which information is printed as a printed layer 70 is attached to the release liner 10. When the multiple protective films are transported or stored during distribution and storage in a form of a stack, the protective film may develop a pressed mark caused by a step due to a thickness of the label L.

However, in the protective film of the present embodiment, because information is printed on a face that is on a side opposite to a side of the pressure sensitive adhesive layer of the release liner, the formation of the pressed mark is prevented in the protective film.

Each layer constituting the protective film of the present embodiment will be described in detail below.

Release Liner

In the present embodiment, the release liner 10 is in direct contact with and laminated to the surface of the pressure sensitive adhesive layer 20, and the release liner 10 is releasable from the pressure sensitive adhesive layer 20. On the surface of the release liner 10, the surface being in contact with the pressure sensitive adhesive layer 20, a release agent such as a silicone may be coated. The release strength required to release the release liner 10 is not particularly limited but is preferably a release strength of a degree that an operator can peel the release liner 10 lightly with hands. The protective film 1a is attached to an adherend in a state where the release liner 10 has been released and the pressure sensitive adhesive layer 20 is exposed.

The constituent material of the release liner 10 is not particularly limited. The release liner 10 preferably contains a resin as a constituent material. Examples of the resin include polyesters such as poly(ethylene terephthalate) (PET); and polyolefins such as polypropylene and polyethylene.

The release liner 10 preferably contains poly(ethylene terephthalate). The content proportion of the poly(ethylene terephthalate) with respect to 100% mass of the release liner 10 is preferably 50 mass % or greater, and more preferably 80 mass % or greater. The release liner 10 is more preferably a poly(ethylene terephthalate) film containing only poly (ethylene terephthalate) as the resin.

The release liner is preferably a release liner that has undergone whitening treatment (coloring treatment into white). Examples of the whitening treatment include, but not limited to, blending of a pigment, cavity formation, and sandblast.

The color of the release liner after coloring is preferably a color that facilitates easy reading of the printed information. As the release liner, a white release liner that has undergone whitening treatment is preferred. With the release liner colored in white, printing in deep color can be employed for good visibility. In a case where the release liner has been subjected to whitening-treatment, the color of the printing is preferably a color other than white and is more preferably gray or black.

Examples of the white pigment in a case where the release liner is colored in white include titanium oxide, zinc oxide, precipitated barium sulfate, calcium carbonate, silica, precipitated silica (white carbon), and plaster. One type of these may be used alone, or a combination of two or more types of these may be used. In a case where the release liner contains a resin as a constituent material, for example, by kneading a pigment into the resin, a whitened release liner can be obtained.

Examples of the resin film having cavities include a film having the white pigments blended therein and being drawn to form cavities around the white pigments; where the film may be a poly(ethylene terephthalate) film, a polypropylene film, a polyethylene film, and a polystyrene film.

The white release liner may have a whiteness index stipulated in JIS Z8715-1999 of 20 or greater, 50 or greater, or 55 or greater.

The "whiteness index" is an indicator of whiteness and stipulated by JIS Z8715-1999, and a greater value of whiteness index indicates a greater degree of whiteness.

As the method of measuring the whiteness index, the whiteness index can be measured by a reflection method in accordance with JIS Z8715-1999 by allowing incidence of a pencil of rays from the surface side of the release liner using a colorimeter (e.g., SE6000, available from Nippon Denshoku Industries Co., Ltd.).

The thickness of the release liner 10 is preferably, for example, 30 μm or greater and 150 μm or less but not limited to this.

Printed Layer

The protective film 1a of the embodiment includes a printed layer 70 having information printed on an opposite side, of the release liner 10, from the pressure sensitive adhesive layer 20. The printed layer 70 indicates the information.

The information printed may be identification information of the protective film, and examples thereof include information such as numbers, including lot numbers and serial numbers; and codes such as bar codes and QR codes (trade name). The information is preferably machine-readable information that can be read by a machine.

Specific form of the printing is not particularly limited, and any form known in the art can be appropriately referred. Examples of the printing method include a thermal transfer method, an inkjet method, and an electrophotography (electrostatic) method.

The printed layer may be a part containing a component such as an ink that is typically used in the printing methods described above and that shows the information. The component such as ink may be deposited on or impregnated into the applied part. The printed layer is typically formed in a portion of an area with respect to the area of the surface of the release liner (or the cap film described below).

The thickness of the printed layer may be, for example, 5 μm or less, or 3 μm or less. In a case where the component such as ink is impregnated into the applied part, the thickness of the printed layer can be considered as 0.

Primer Layer

Figure 2:
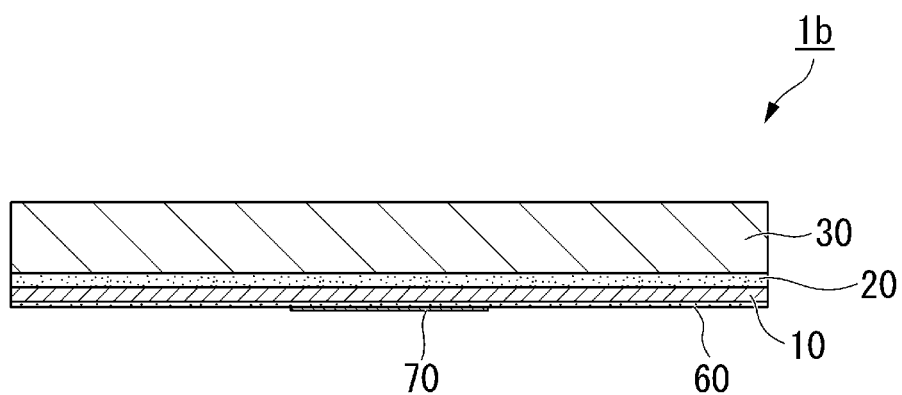
FIG. 2 is a cross-sectional view illustrating an example of a protective film according to an embodiment of the present invention.

Like the protective film 1b illustrated in FIG. 2, the protective film of the present embodiment may further include a primer layer 60 on an opposite side, of the release liner 10, from the pressure sensitive adhesive layer 20.

The primer layer 60 is a layer that enables enhancement of adhesion of the printing for the application target in a case where the constituent component such as ink constituting the printing is applied with the primer layer being provided between the ink and the application target, compared to a case where the constituent component such as ink constituting the printing is applied without the primer layer. The primer layer may be also referred to as an adherable surface.

In an example illustrated in FIG. 2, the primer layer 60 is in direct contact with and laminated to the surface of the release liner 10, and the printed layer 70 is in direct contact with and laminated to the surface of the primer layer 60. When the primer layer 60 is provided on the release liner 10, adhesion of the printed layer 70 to the release liner 10 is enhanced.

The constituent component of the primer layer 60 may be appropriately selected based on the constituent component of the ink constituting the print. For example, the constituent component may contain a resin such as an acrylic resin, a styrene resin, a polyester resin, a urethane resin, a polyester urethane resin, and an acrylic urethane resin.

The thickness of the primer layer 60 may be, for example, 0.1 μm or less, or from 0.01 to 0.1 μm.

Pressure Sensitive Adhesive Layer

The pressure sensitive adhesive layer 20 has a function as a pressure sensitive adhesive. The protective film can be adhered to an adherend by subjecting the surface of the pressure sensitive adhesive layer 20 to pressure sensitive adhesion to the adherend. In the present embodiment, the pressure sensitive adhesive layer 20 is in direct contact with and laminated to the surfaces of the release liner 10 and the base material film 30.

The material used for the formation of the pressure sensitive adhesive layer 20 is not particularly limited. For example, the pressure sensitive adhesive layer 20 may be formed by a pressure sensitive adhesive composition containing an acrylic pressure sensitive adhesive, a rubber pressure sensitive adhesive, a silicone pressure sensitive adhesive, polyurethane pressure sensitive adhesive, or the like. One type of these pressure sensitive adhesives may be used alone, or a combination of two or more types of these pressure sensitive adhesives may be used.

Examples of the acrylic pressure sensitive adhesive include those formed by cross-linking a copolymer of a (meth)acrylate monomer and a cross-linkable functional group-containing monomer using a cross-linking agent.

Examples of the (meth)acrylate monomer include butyl acrylate and 2-ethylhexyl acrylate.

Examples of the cross-linkable functional group-containing monomer include acrylic acid and 2-hydroxyethyl acrylate.

Examples of the cross-linking agent include an isocyanate cross-linking agent, an epoxy cross-linking agent, and a metal chelate cross-linking agent.

Examples of the rubber pressure sensitive adhesive include block copolymers such as styrene-isoprene-styrene and polymethyl methacrylate-polybutyl acrylate-polymethyl methacrylate.

Examples of the silicone pressure sensitive adhesive include those formed by addition-reacting a polydimethylsiloxane having a vinyl group and a polydimethylsiloxane having a hydrosilyl group.

Examples of the urethane pressure sensitive adhesive include those formed by cross-linking a polyurethane polyol using an isocyanate cross-linking agent.

The pressure sensitive adhesive composition may contain a solvent, a plasticizer, a pressure sensitive adhesion-imparting material, a stabilizer, and the like, as necessary, besides the pressure sensitive adhesive.

The thickness of the pressure sensitive adhesive layer 20 may be, for example, 10 μm or greater and 100 μm or less but not limited to this.

Base Material Film

In the present embodiment, the base material film 30 is in direct contact with and laminated to the surface of the pressure sensitive adhesive layer 20. The base material film 30 contains polyurethane or poly(vinyl chloride). The content proportion of the polyurethane or poly(vinyl chloride) with respect to 100% mass of the base material film 30 is preferably 50 mass % or greater, and more preferably 80 mass % or greater. The base material film 30 is more preferably a polyurethane film or poly(vinyl chloride) film which contains polyurethane or poly(vinyl chloride) as a resin.

The base material film containing polyurethane or poly (vinyl chloride) as a constituent material has good conformability to the surface of an adherend and can be suitably attached to a surface of an adherend including a curved face.

Examples of the polyurethane include polyester polyurethane, polyether polyurethane, and polycarbonate polyurethane.

The polyester polyurethane is formed by a reaction of polyester polyol and polyisocyanate. The polyether polyurethane is formed by a reaction of polyether polyol and polyisocyanate. The polycarbonate polyurethane is formed by a reaction of polycarbonate polyol and polyisocyanate.

The poly(vinyl chloride) is a polymer having a repeating unit derived from vinyl chloride. The poly(vinyl chloride) may be a homopolymer of vinyl chloride or may be a copolymer of vinyl chloride and a monomer that is copolymerizable with the vinyl chloride. Examples of the copolymer include copolymers mainly containing vinyl chloride, such as an ethylene-vinyl chloride copolymer, a vinyl acetate-vinyl chloride copolymer, and a vinyl chloride-halogenated olefin copolymer.

The modulus of elasticity in tension at 23° C. of the base material film 30 may be, for example, from 10 to 1500 MPa, or from 10 to 1000 MPa, from the perspective of more suitably exhibiting conformability to a surface of an adherend.

The modulus of elasticity in tension of the base material film 30 can be determined by performing a tensile test in which a test piece having a width of 15 mm and a length of greater than 100 mm made from a base material film 30 is stretched at a tensile speed of 200 mm/min and a distance of 100 mm between grips, to determine a modulus of elasticity in tension of the test piece in an elastic deformation region at 23° C.

The thickness of the base material film 30 may be, for example, 100 μm or greater and 300 μm or less, or 130 μm or greater and 200 μm or less. When the thickness of the base material film 30 is not greater than the upper limit value described above, flexibility can be enhanced. When the thickness is not less than the lower limit value described above, scratch resistance can be enhanced.

Surface Coating Layer

Figure 3:
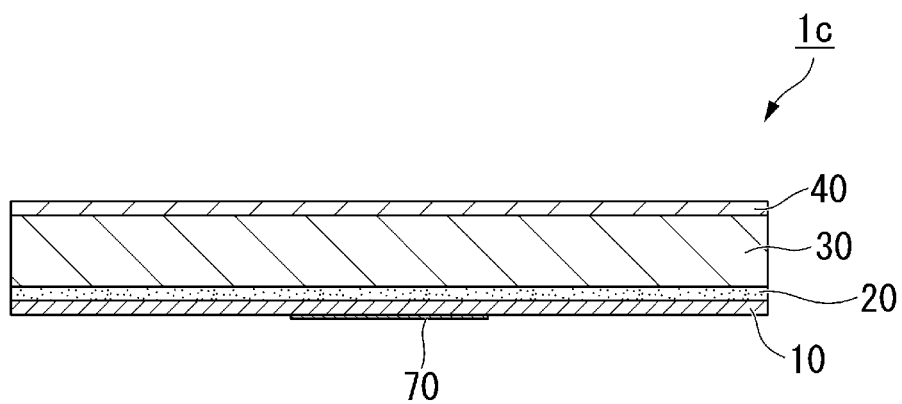
FIG. 3 is a cross-sectional view illustrating an example of a protective film according to an embodiment of the present invention.

Like the protective film 1c illustrated in FIG. 3, the protective film of the present embodiment may further include a surface coating layer 40 on an opposite side, of the base material film 30, from the pressure sensitive adhesive layer 20.

In the example illustrated in FIG. 3, the surface coating layer 40 is in direct contact with and laminated to the surface of the base material film 30. The material used for formation of the surface coating layer 40 is not particularly limited but preferably contains a fluororesin or urethane resin, from the perspectives of achieving antifouling properties and self-repair properties. The fluororesin or urethane may be a cross-linked body. The content proportion of the fluororesin or urethane resin with respect to 100% mass of the surface coating layer 40 is preferably 50 mass % or greater, and more preferably 80 mass % or greater.

Examples of the fluororesin include those formed by cross-linking a copolymer of fluoro olefin and hydroxyalkyl vinyl ether by an isocyanate cross-linking agent.

Examples of the urethane resin include those formed by cross-linking polyester polyurethane by an isocyanate cross-linking agent.

The thickness of the surface coating layer 40 is not particularly limited and, for example, is from 0.5 to 50 μm.

According to the protective film of the embodiment including a surface coating layer 40 as an outermost layer, a flexible base material film can be protected. Furthermore, the protective film of the embodiment suitably exhibits antifouling properties and self-repair properties. For example, the protective film can be suitably employed for a use where the protective film is attached and used on a touchscreen-type display screen.

The printed layer, the primer layer, the release liner, the pressure sensitive adhesive layer, the base material film, and the surface coating layer described above may be each formed from a single layer or multiple layers. In a case of multiple layers, the layers may be the same or different.

The thickness of each of the release liner, the pressure sensitive adhesive layer, the base material film, and the surface coating can be determined as an average value obtained by measuring thicknesses at randomly chosen 10 points. In a case of multiple layers, the thickness is the total thickness of the multiple layers.

Examples of a preferable combination of constituent materials of the protective film of the present embodiment include a combination of: a release liner containing a whitening-treated poly(ethylene terephthalate), a pressure sensitive adhesive layer formed by an acrylic pressure sensitive adhesive, a base material film containing polyurethane, and a surface coating layer containing a fluororesin.

Note that the protective film of the first embodiment described above may further include a cap film described below (also referred to as "cap sheet") (it is noted, in the cap film, information may not be printed on an opposite side from the base material film).

An example of a protective film of one embodiment is a protective film including a release liner, a pressure sensitive adhesive layer, a base material film, and a cap film laminated in this order in the thickness direction thereof, in which the base material film contains polyurethane or poly(vinyl chloride), the cap film is releasable from the protective film after the release liner has been released and removed from the protective film and the protective film is attached to an adherend, and information is printed on an opposite side, of the release liner, from the pressure sensitive adhesive layer.

An example of a protective film of another embodiment is a protective film including a release liner, a pressure sensitive adhesive layer, a base material film, a surface coating layer, and a cap film laminated in this order in the thickness direction thereof, in which the base material film contains polyurethane or poly(vinyl chloride), the cap film is releasable from the protective film after the release liner has been released and removed from the protective film and the protective film is attached to an adherend, and information is printed on an opposite side, of the release liner, from the pressure sensitive adhesive layer.

The protective film of the embodiment is suitable for a use where the release liner is released and removed, and the protective film is attached to a display screen of a device and used.

Examples of the device include personal digital assistants such as smartphones, cellular phones, smartwatches, notebook computers, and tablets. Examples of the display screen include surfaces of various display modules such as liquid crystal displays (LCD) and organic light emitting diode (OLED). Preferably, the display screen is operable as a touchscreen.

The display screen may be a curved display of a shape that includes a curved surface partially or in its entirety, and may be a curved display of a shape that includes curved surfaces in its end portion.

With the exception of the release liner, the pressure sensitive adhesive layer, the base material film, and the surface coating layer of the protective film of the embodiment are preferably transparent. Transparency required may only need to enable a user to visually confirm contents of a display screen of a device, when the user uses the device with the protective film being attached to the display screen of the device.

The protective film of the embodiment is preferably cut into a shape corresponding to a design feature of the device. Examples of the design feature of the device include not only a shape and size of the screen, but also design features corresponding to parts such as a camera lens, a microphone, a speaker, and a manual operation button that are provided on or around the display screen. The protective film may be cut into a shape, with which the protective film can be attached to the display screen without covering the parts such as a camera lens, a microphone, a speaker, and a manual operation button.

Second Embodiment

The protective film of the present embodiment is a protective film including a release liner, a pressure sensitive adhesive layer, a base material film, and a cap film laminated in this order in a thickness direction thereof, in which the base material film contains polyurethane or poly(vinyl chloride), the cap film is releasable from the protective film after the release liner has been released and removed from the protective film and the protective film is attached to an adherend, and information is printed on an opposite side, of the cap film, from the base material film.

Figure 4:
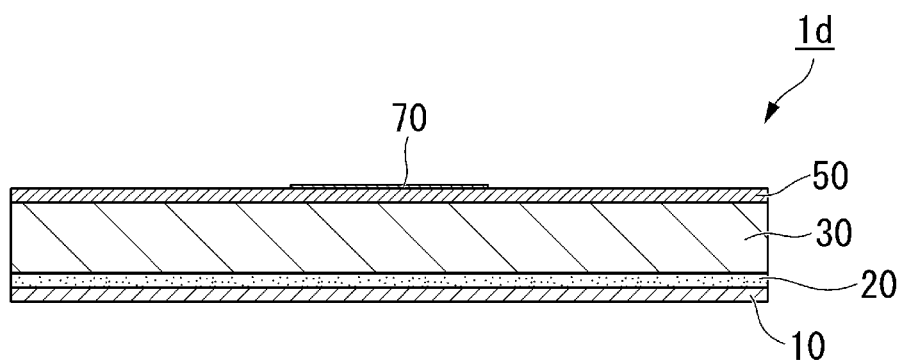
FIG. 4 is a cross-sectional view illustrating an example of a protective film according to an embodiment of the present invention.

FIG. 4 is a cross-sectional view illustrating an example of a protective film according to the present embodiment. As illustrated in FIG. 4, the protective film 1d of the present embodiment includes a release liner 10, a pressure sensitive adhesive layer 20, a base material film 30, and a cap film 50 laminated in this order in a thickness direction thereof. The cap film 50 is releasable from the protective film 1d after the release liner 10 has been released and removed from the protective film 1d and the protective film 1d is attached to an adherend, and information is printed on an opposite side, of the cap film 50, from the base material film 30. Note that the printed information is illustrated as a printed layer 70.

The protective film of the present embodiment is a protective film described in the first embodiment including the cap film 50 and information is printed on a face of the cap film 50.

The detailed description for the part having the same constitution as the protective film of the first embodiment described above will be omitted.

In the protective film of the present embodiment, information is printed on an opposite side, of the cap film, from the base material film, and because typically the printing is thin or has no thickness, development of pressed marks on the protective film can be prevented. Even if the printing has a thickness, by having the cap film, the protective film is prevented from developing pressed marks on the flexible base material film or pressure sensitive adhesive layer.

Note that "on an opposite side, of the cap film 50, from the base material film 30" means that the information is printed at a position on a side that is opposite to a side of the base material film 30 with respect to the cap film 50, and printing is not required to be in a direct contact with the cap film 50.

Cap Film

In the present embodiment, the cap film 50 is in direct contact with and laminated to the surface of the surface coating layer 40. The cap film 50 is laminated in a manner that the cap film 50 is releasable from the surface coating layer 40. The cap film 50 may be laminated utilizing wettability of the surface coating layer. Alternatively, the cap film 50 may be laminated with a releasable pressure sensitive adhesive layer provided between the cap film 50 and the surface coating layer 40.

The cap film preferably contains poly(ethylene terephthalate) or polypropylene as a constituent material and more preferably contains poly(ethylene terephthalate). The cap film 50 is preferably a biaxially stretched film and more preferably a biaxially stretched poly(ethylene terephthalate) film or polypropylene film.

The biaxial stretching improves the modulus of elasticity in tension of the cap film, and can easily impart greater resistance against deformation to the cap film than that of a base material film containing polyurethane or poly(vinyl chloride).

Even for a protective film of an embodiment including the base material film containing a highly flexible polyurethane or poly(vinyl chloride), a cap film 50 containing a poly(ethylene terephthalate) or polypropylene film as a constituent material, or a cap film 50 preferably containing a biaxially stretched poly(ethylene terephthalate) film or polypropylene film, can further effectively prevent elongation of the protective film during attaching operation (such as squeegeeing and re-attaching operation for positioning) of the protective film.

The modulus of elasticity in tension at 23° C. of the cap film 50 may be, for example, from 2000 to 7000 MPa, or 3000 to 6000 MPa, from the perspective of more effectively suppressing elongation of the protective film.

The modulus of elasticity in tension of the cap film 50 can be determined by performing a tensile test in which a test piece having a width of 15 mm and a length of greater than 100 mm made from a cap film 50 is stretched at a tensile speed of 200 mm/min and a distance of 100 mm between grips, to determine a modulus of elasticity in tension of the test piece in an elastic deformation region at 23° C.

As an example, the modulus of elasticity in tension at 23° C. of the cap film 50 is preferably greater than the modulus of elasticity in tension at 23° C. of the base material film 30.

The thickness of the cap film 50 is, for example, preferably 10 μm or greater and 150 μm or less, and more preferably 20 μm or greater and 80 μm or less, but not limited to this.

When the thickness of the cap film 50 is not less than the lower limit value, effect of suppressing elongation of the protective film is more effectively exhibited. When the thickness of the cap film 50 is not greater than the upper limit value, even better conformability is achieved.

The release liner 10 and the cap film 50 are each preferably a poly(ethylene terephthalate) film, and similar compositions can be exemplified for the release liner 10 and the cap film 50. However, because it is preferable for the cap film 50 to be attached to an adherend to have more enhanced conformability than the release liner 10 does, the thickness of the cap film 50 is preferably thinner than the thickness of the release liner 10.

The cap film may be formed from a single layer or multiple layers. In a case of multiple layers, the layers may be the same or different.

The thickness of the cap film can be determined as an average value obtained by measuring thicknesses at randomly chosen 10 points. In a case of multiple layers, the thickness is the total thickness of the multiple layers.

In a case where the protective film includes both the release liner and the cap film, the release liner is preferably a whitening-treated release liner. Even in a case where only the release liner has undergone whitening treatment and information is printed on the cap film, readability can be enhanced.

With the exception of the release liner, the pressure sensitive adhesive layer, the base material film, the surface coating layer, and the cap film of the protective film of the embodiment are preferably transparent.

Figure 5:
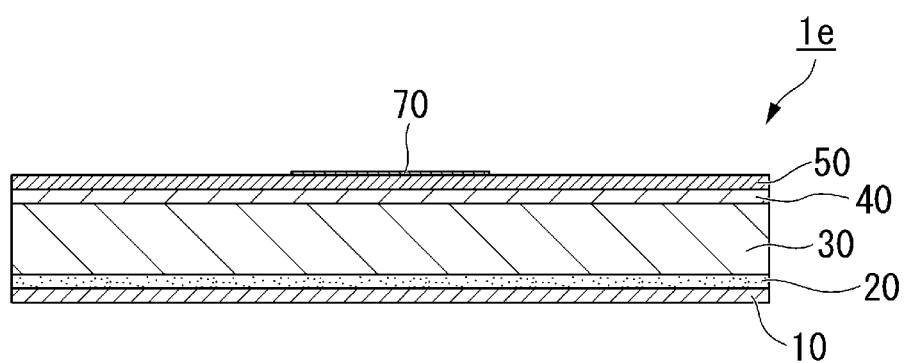
FIG. 5 is a cross-sectional view illustrating an example of a protective film according to an embodiment of the present invention.

Note that, like the protective film 1e illustrated in FIG. 5, the protective film of the present embodiment preferably further include a surface coating layer 40 on an opposite side, of the base material film 30, from the pressure sensitive adhesive layer 20. The protective film 1e includes a release liner 10, a pressure sensitive adhesive layer 20, a base material film 30, a surface coating layer 40, and a cap film 50 laminated in this order in a thickness direction thereof.

Examples of the surface coating layer include those exemplified for the surface coating layer described above.

Figure 6:
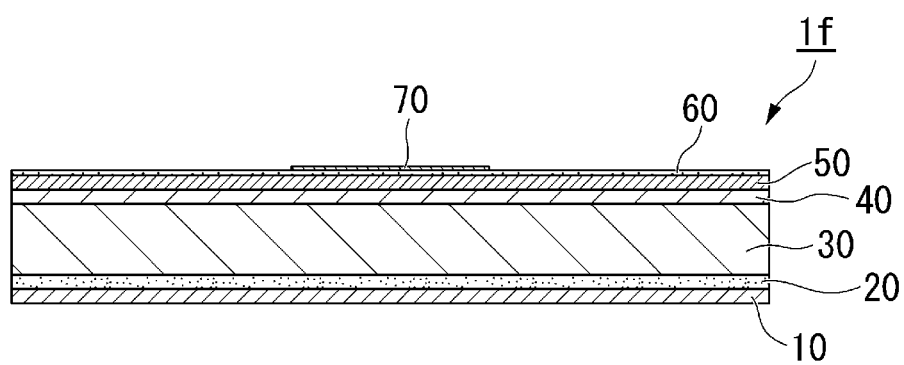
FIG. 6 is a cross-sectional view illustrating an example of a protective film according to an embodiment of the present invention.

Note that, like the protective film if illustrated in FIG. 6, the protective film of the present embodiment may further include a primer layer 60 on an opposite side, of the cap film 50, from the base material film 30. In this case, information can be printed on an opposite side, of the primer layer 60, from the cap film 50. Note that the printed information is illustrated as a printed layer 70.

When the primer layer 60 is provided on the cap film, adhesion of the printed layer 70 to the cap film 50 can be enhanced.

Examples of the primer layer include those exemplified for the first embodiment described above.

Examples of a preferable combination of constituent materials of the protective film of the present embodiment include a combination of: a release liner containing a whitening-treated poly(ethylene terephthalate), a pressure sensitive adhesive layer being formed by an acrylic pressure sensitive adhesive, a base material film containing polyurethane, a surface coating layer containing a fluororesin, and a cap film containing poly(ethylene terephthalate).

The total thickness, excluding the release liner, of the protective film of the embodiment may be, for example, from 110 to 600 μm, or may be from 160 to 430 μm.

When the total thickness, excluding the release liner, of the protective film is not less than the lower limit value, impact resistance is more effectively exhibited. When the total thickness of the protective film is not greater than the upper limit value, conformability to an adherend is more effectively exhibited.

Note that, in the embodiment described above, a case where information is printed on the release liner or cap film of the protective film has been illustrated; however, in a case where the protective film includes the release liner and the cap film, information may be printed on both of the release liner and the cap film.

According to the protective film of the embodiments described above, when the base material film contains polyurethane or poly(vinyl chloride), the protective film can achieve good conformability to a display screen (adherend). Even when the end part of the display screen is curved, attaching can be performed suitably.

However, in a case where a protective film includes highly flexible base material film having good conformability to a display, if a tag or label on which information is printed is attached, the protective film tends to be affected by the height difference, and may develop pressed marks.

However, in the protective film of the embodiment, because information is printed on the release liner and/or the cap film, development of pressed marks on the protective film are prevented. Furthermore, the release liner and/or the cap film to which information is printed can be released before attachment or after attachment to an adherend, and thus the information can be used without leaving the information on the protective film at the time of use.

Furthermore, according to the protective film of the embodiment including the cap film, the protective film is less likely to be elongated unintentionally during attachment, and for example, misalignment between the shape of the protective film after attachment and the shape of the design feature of the device caused by elongation of the protective film is prevented.

Furthermore, according to the protective film of the embodiment including a cap film, when information is printed on the cap film, print adherence of the printing is enhanced compared to a case where information is printed on a release liner to which a release agent has been transferred.

Furthermore, when the primer layer 60 is provided on the release liner and/or the cap film, print adherence of the printing to the release liner and/or the cap film is further improved.

Display Body

The display body of an embodiment includes a display body including a pressure sensitive adhesive layer and a base material film of a protective film described in the embodiments above on a display screen of a device. The display body of the embodiment can further include a surface coating layer and/or a cap film.

Examples for each constitution of the protective film include the same constitutions for the first embodiment and the second embodiment of the protective film described above.

Examples of the device and the display screen thereof include the same constitutions for the embodiments of the protective film described above.

The display body of the embodiment can be produced by attaching the protective film described in the embodiments above onto the display screen of the device. The produced display body of the embodiment has high conformability to a curved surface in an end portion of the display screen of the device, prevents occurrence of pressed marks of the protective film, and is in high quality. The method for producing the display body will be described below.

Method for Producing Display Body

The method for producing the display body of the embodiment includes attaching, the attaching including releasing and removing the release liner from the protective film of the embodiment described above and attaching the protective film, from which the release liner has been released and removed, onto the display screen of the device.

Furthermore, in a case where the protective film of the embodiment includes a cap film, the attaching described above may be performed in a state the protective film includes the cap film; and then after the attaching, releasing the cap film from the protective film attached to the adherend may be further performed.

In the attaching, the protective film includes the cap film, possibility of occurrence of elongation of the base material film due to the attaching operation such as squeegeeing in the attaching can be further reduced, and attachment of the protective film in a misaligned position due to misalignment of the notch corresponding to the position of a camera lens, a microphone, a speaker, or the like is prevented. In the releasing, because the cap film can be released after the attachment of the protective film to the adherend, good conformability to the display screen (adherend) is effectively exhibited.

Figure 8A:
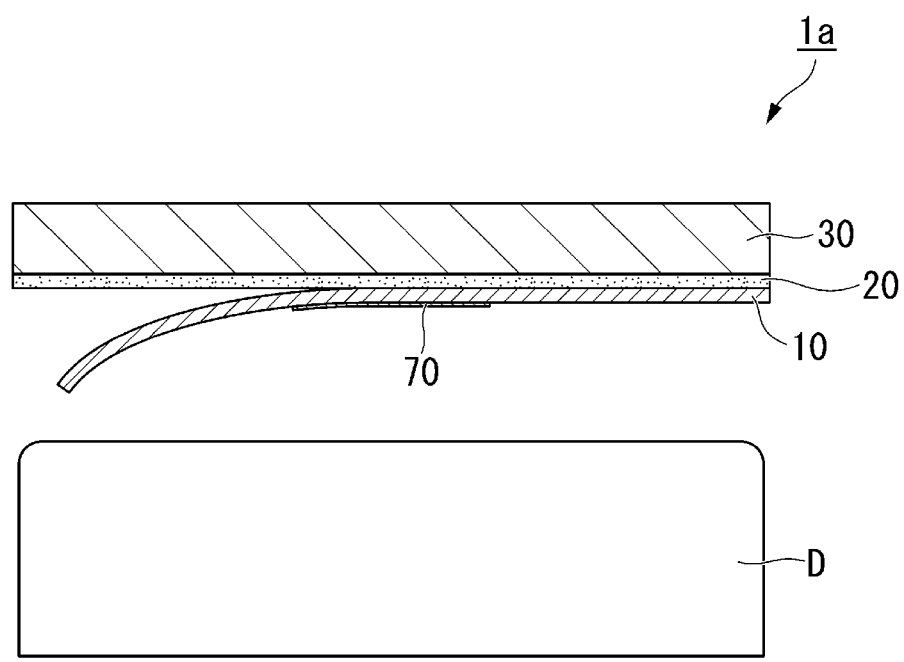
FIG. 8A is a schematic view explaining a method for producing a display body according to an embodiment of the present invention.
Figure 8B:
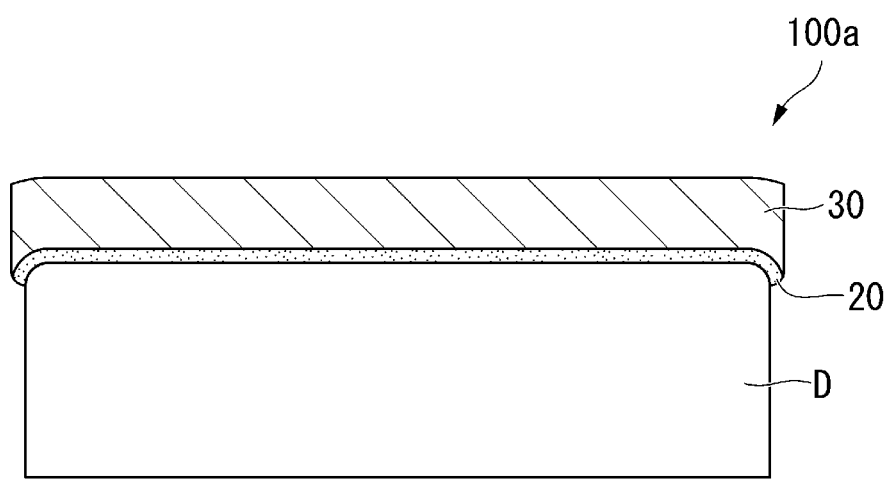
FIG. 8B is a schematic view explaining a method for producing a display body according to an embodiment of the present invention.

Referring to FIGS. 8A and 8B, the method for producing a display body of an embodiment will be described below using a case where the protective film 1a of the embodiment illustrated above is used as an example.

As an example, first, a release liner 10 is released and removed from a protective film 1a. Thus, information printed on the release liner (printed layer 70) is also released and removed together with the release liner 10 (FIG. 8A).

Then, an exposed pressure sensitive adhesive layer 20 is attached to a surface of a display screen D of a device (FIG. 8B). In this way, a display body 100a of an embodiment including the pressure sensitive adhesive layer, the base material film, and the surface coating layer of the protective film described in the embodiment above on the display screen can be produced.

Furthermore, referring to FIGS. 9A and 9B, the method for producing a display body of an embodiment will be described using a case where the protective film 1d is used as an example.

Figure 9A:
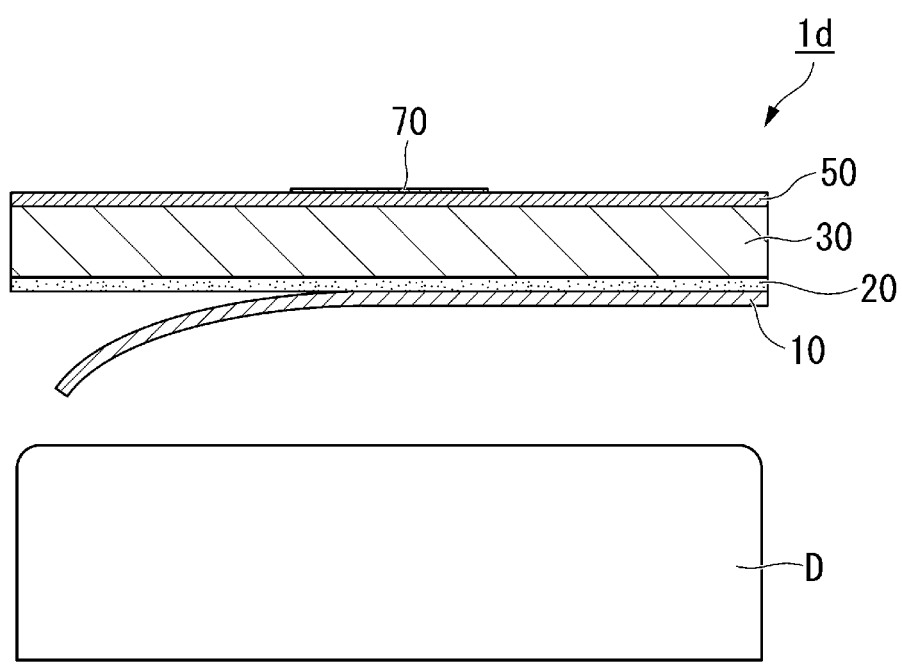
FIG. 9A is a schematic view explaining a method for producing a display body according to an embodiment of the present invention.

As an example, first, a release liner 10 is released and removed from a protective film 1d (FIG. 9A). Then, an exposed pressure sensitive adhesive layer 20 is attached to a surface of a display screen D of a device.

Figure 9B:
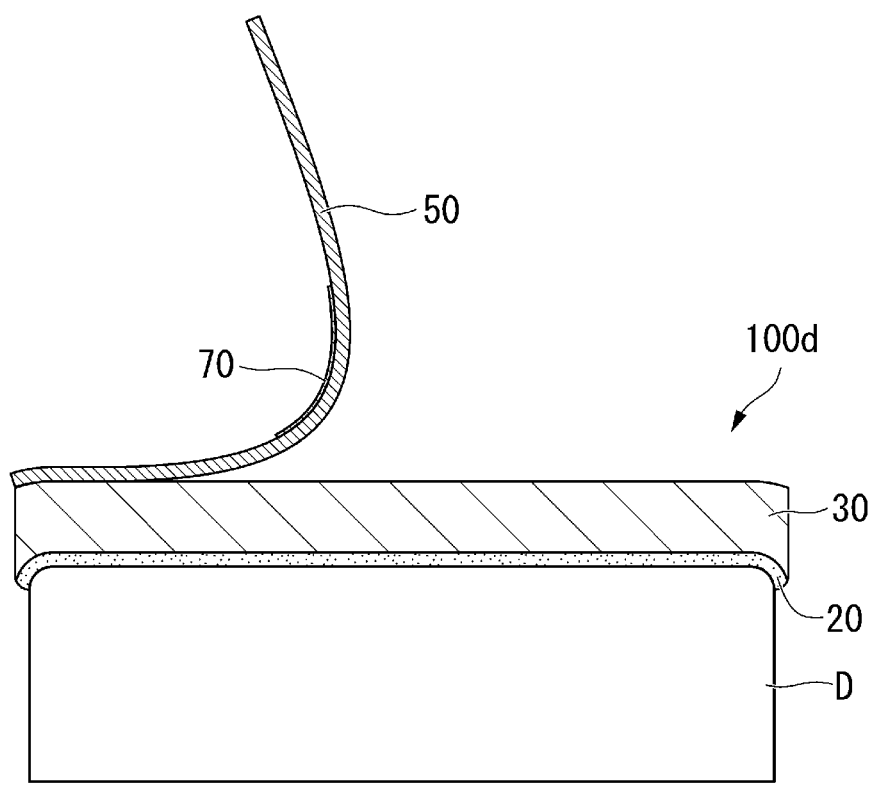
FIG. 9B is a schematic view explaining a method for producing a display body according to an embodiment of the present invention.

After the protective film 1d is attached to an adherend, the cap film 50 laminated on the base material film 30 is released and removed (FIG. 9B). Thus, the information printed on the cap film 50 (printed layer 70) is also released and removed together with the cap film 50. In this way, a display body 100d of an embodiment including the pressure sensitive adhesive layer and the base material film of the protective film described in the embodiment above on the display screen can be produced.

Note that, also in a case where a protective film of another embodiment that is not described in the method for producing a display body is used, by performing attaching in the same manner as described above, a display body including at least a pressure sensitive adhesive layer and a base material film of a protective film, on a display screen can be produced.

Method for Producing Protective Film

The protective film according to an embodiment can be produced by sequentially laminating each of the layers described above so as to have a corresponding positional relationship.

According to the method for producing a protective film of the embodiment, the protective films of the embodiments described above can be produced.

For the method for producing a protective film, the method for producing a protective film if of an embodiment will be described below.

For example, first, a surface coating layer 40 is formed on a base material film 30. The surface coating layer 40 can be formed by, for example, coating a composition containing a fluororesin and a cross-linking agent or a urethane resin and a cross-linking agent on a surface of the base material film 30 and curing the coating.

The composition may further contain a solvent. Specific examples of the solvent include ester-based solvents such as ethyl acetate and butyl acetate; ketone-based solvents such as methyl ethyl ketone and methyl isobutyl ketone; and aromatic solvents such as toluene and xylene. One type of the solvents may be used alone, or a combination of two or more types of the solvents may be used.

The coating method of the composition is not particularly limited and, for example, coating can be performed by using a known coating machine such as roll coaters, knife coaters, air-knife coaters, bar coaters, blade coaters, slot-die coaters, lip coaters, and gravure coaters.

After the coating, the solvent is removed from the composition by drying treatment, and thus a coating is formed. The drying conditions at this time are not particularly limited, and from the perspective of solvent removal, from 60 to 150° C. is preferred. Furthermore, the drying time may be appropriately set to a time by which drying is completed and, for example, may be approximately from 30 seconds to 3 minutes.

After formation of the coating, the cap film 50 including the primer layer 60 is provided thereon. Before completion of the curing of the coating, in a state where the coating and the cap film 50 thereon are arranged, for example, by further allowing the coating to stand still for approximately 1 week, curing of the coating is completed. Alternatively, after the coating is cured, a cap film 50 may be arranged by providing a releasable pressure sensitive adhesive layer (not illustrated) therebetween.

The primer layer 60 can be formed by, for example, coating a composition containing a constituent component of the primer layer onto a side for which the primer layer is formed, by a bar coating method, a gravure coating method, a knife coating method, or a die coating method.

Furthermore, the pressure sensitive adhesive layer 20 is formed by coating a pressure sensitive adhesive to a release liner, and the release liner is bonded to an exposed face of the base material film 30 by providing the pressure sensitive adhesive layer 20 between the release liner and the base material film 30, and thus, the pressure sensitive adhesive layer 20 and the release liner can be provided. Alternatively, after the pressure sensitive adhesive layer 20 is formed by coating and drying the pressure sensitive adhesive onto an exposed face of the base material film 30, a release liner may be bonded thereto.

Then, printing is performed on the primer layer of the cap film, and thus a printed layer 70 is formed. Examples of the means for forming the printed layer include those described above. In this way, the protective film of the embodiment can be obtained.

Note that, like the protective films 1a to 1c, in a case where information is printed on a release liner, a printed layer may be formed on a release liner instead of a cap film.

EXAMPLES

The present invention is described in further detail below through the presentation of examples, but the present invention is not limited by these examples. For the parts assigned with reference signs, FIG. 3 (Examples 1 and 2), FIG. 5 (Example 3), or FIG. 6 (Example 4) may be referred to.

Production of Protective Film

Example 1

A solution was prepared by mixing a copolymer of fluoro olefin and hydroxyalkyl vinyl ether (ethyl acetate solution having a solid content of 20.3 mass %; hydroxyl value: 67.0 mgKOH/g resin) and an isocyanate-based cross-linking agent (solids content: 75 mass %, NCO: 13.0 mass %) to give a ratio of (NCO in the cross-linking agent)/(OH in the fluororesin) to be 1/1. This solution was coated on a base material film 30 (a polyurethane film made of polyurethane and having a thickness of 150 μm; modulus of elasticity in tension: 50 MPa) and then dried at 100° C. for 5 minutes, and thus a surface coating layer 40 having a thickness of 7 μm was formed on the base material film 30.

An acrylic solvent-type pressure sensitive adhesive [a mixture of a main agent: 100 parts by mass of acrylate copolymer solution (solids content: 40 mass %; monomer ratio: 95 parts by mass of butyl acrylate and 5 parts by mass of acrylic acid) and a cross-linking agent: 0.5 parts by mass of isocyanate-based cross-linking agent solution (solids content: 75 mass %)] was prepared and coated onto a transparent release liner 10 (obtained by coating a silicone to a PET film having a thickness of 75 μm) by a knife coater, and thus a pressure sensitive adhesive layer 20 having a thickness of 35 μm was formed on the transparent release liner 10.

An exposed face of a base material of a laminate in which the base material film 30 and the surface coating layer 40 formed as described above were laminated was stacked on an exposed face of the pressure sensitive adhesive layer 20 of the laminate in which the release liner 10 and the pressure sensitive adhesive layer 20 were laminated and subjected to pressure bonding.

On a surface of the transparent release liner 10, bar code was printed by a thermal transfer method, and thus a protective film of Example 1 was obtained.

Example 2

A protective film of Example 2 was obtained in the same manner as in Example 1 described above except for using a white release liner 10' (PET film having a thickness of 75 μm, obtained by kneading silica particles as white pigments) in place of the transparent release liner 10 of Example 1.

The whiteness index stipulated in JIS Z8715-1999 of the white release liner was 60.

Example 3

The layers were laminated in the same manner as in Example 1 described above except for coating the solution used for the formation of the surface coating layer 40 in Example 2 described above onto the base material film 30 and then laminating a cap film 50 (biaxially stretched PET film having a thickness of 25 μm; modulus of elasticity in tension: 4000 MPa) on the coating thereof.

On a surface of the cap film 50, bar code was printed by a thermal transfer method, and thus a protective film of Example 3 was obtained.

Example 4

A protective film of Example 4 was obtained in the same manner as in Example 3 described above except for, in Example 3, using a cap film 50 having a primer layer 60 having a thickness of 0.06 μm, and providing a printed layer 70 by printing a code on a surface of the primer layer 60 by a thermal transfer method.

The primer layer is made of a polyester resin.

Comparative Example 1

A protective film of Comparative Example 1 was prepared in the same manner as in Example 3 described above except for using a transparent release liner 10 in place of the white release liner 10' of Example 3 and attaching a white pressure sensitive adhesive label (thickness: 50 μm) on which a bar code is printed on a white base material onto a surface of the release liner, instead of printing a code on the surface of the cap film 50.

Evaluation

Pressed Mark

For the protective film produced in each of Examples and Comparative Example described above, 50 sheets of the protective films were stacked and stored and allowed to stand still for 7 days.

Then, the protective films stacked at from the bottommost to the tenth bottommost protective films were taken out. The pressed marks due to the storage while the protective films were stacked were evaluated based on the following criteria.

A: The pressed marks were not observed in all 10 sheets of the protective films

F: The pressed marks were observed in some of the 10 sheets of the protective films.

Readability

The bar code provided on each of the protective films produced in Examples and Comparative Example described above was read by a bar code reader (application) of a smartphone, and readability was evaluated based on the following criteria.

A: There were some cases where the bar code was not recognized by the reader.

B: Recognition of the bar code by the reader was good.

Print Adherence

For the protective film produced in each of Examples and Comparative Example described above, a cellophane tape was attached to the printed bar code part, and the cellophane tape was removed immediately afterwards. And thus print adherence was evaluated based on the following criteria.

A+: No blurring or removal of the printing was confirmed, and print adherence was excellent.

A: Almost no blurring or removal of the printing was confirmed, and print adherence was good.

B: Blurring or removal of the printing was confirmed in some parts.

The constitutions of the protective films, and the evaluation results for the protective films described above are shown in Table 1.

TABLE 1

|  | Example 1 | Example 2 | Example 3 | Example 4 | Comparative Example 1 |
|---|---|---|---|---|---|
| Information display method | Printing | Printing | Printing | Printing | Label attachment |
| Cap film | None | None | Present | Present (Primer layer present) | Present |
|  |  |  | Transparent (Untreated) | Transparent | Transparent |
| Release liner | Present Transparent | Present White | Present White | Present White | Present Transparent |
| Printed part | Release liner | Release liner | Cap film | Cap film (Primer layer) | Label |
| Pressed mark | A | A | A | A | F |

TABLE 1-continued

|  | Example 1 | Example 2 | Example 3 | Example 4 | Comparative Example 1 |
|---|---|---|---|---|---|
| Readability | B | A | A | A | A |
| Print adherence | B | B | A | A+ | A |

In Comparative Example 1, because the pressure sensitive adhesive label on which the bar code was printed on the white base material was attached, although it had good readability of the bar code, a pressed mark having a shape corresponded to the pressure sensitive adhesive label was confirmed.

Based on the shape and position of the pressed mark, it was presumed that the pressed mark was caused by the height difference of the pressure sensitive adhesive labels being pressed against the soft polyurethane film (base material film).

On the other hand, for Examples 1 to 4 in which the code was printed on the release liner or the cap film, no pressed mark was confirmed.

Regarding readability, Examples 2 to 4 in which the release liner was subjected to white coloring treatment exhibited improved readability of bar code compared to that of Example 1.

Regarding print adherence, Examples 3 and 4 in which printing was performed on the cap film had better print adherence than Examples 1 and 2 in which printing was performed on the release liner. It is presumed that this is because printing on the cap film is less likely to be affected by the release treatment agent contained in the release liner.

Furthermore, Example 4 in which the cap film included the primer layer exhibited particularly excellent print adherence.

Each configuration in each of the embodiments and the combinations thereof are merely examples, and additions, omissions, substitutions, and other changes may be made to the configuration within a range that does not depart from the spirit of the present invention. The present invention is also not limited by each of the embodiments and is limited only by the scope of the claims.

What is claimed is:

1. A protective film comprising:
   a release liner;
   a pressure sensitive adhesive layer;
   a base material film; and
   a cap film,
   laminated in this order in a thickness direction thereof, wherein
   the base material film contains polyurethane or poly(vinyl chloride),
   the cap film is releasable from the protective film after the release liner has been released and removed from the protective film and the protective film is attached to an adherend,
   identification information is printed on an opposite side, of the cap film, from the base material film,
   the base material film has a modulus of elasticity in tension at 23° C. of 10 to 1500 MPa,
   the cap film has a modulus of elasticity in tension at 23° C. of 2000 to 7000 MPa,
   the release liner is whitening-treated, and
   the pressure sensitive adhesive layer, the base material film and the cap film are transparent.

2. The protective film according to claim 1, further comprising a surface coating layer on an opposite side, of the base material film, from the pressure sensitive adhesive layer, wherein the release liner, the pressure sensitive adhesive layer, the base material film, the surface coating layer, and the cap film are laminated in this order in the thickness direction thereof.

3. The protective film according to claim 2, wherein the surface coating layer is in direct contact with and laminated to the surface of the base material film, and the surface coating layer contains a fluororesin or urethane resin.

4. The protective film according to claim 3, wherein a content proportion of the fluororesin or urethane resin with respect to 100% mass of the surface coating layer is 50 mass % or greater.

5. The protective film according to claim 4, wherein the content proportion of the fluororesin or urethane resin with respect to 100% mass of the surface coating layer is 80 mass % or greater.

6. The protective film according to claim 3, wherein the cap film is in direct contact with and laminated to the surface of the surface coating layer.

7. The protective film according to claim 6, wherein a content proportion of the fluororesin or urethane resin with respect to 100% mass of the surface coating layer is 50 mass % or greater.

8. The protective film according to claim 7, wherein the content proportion of the fluororesin or urethane resin with respect to 100% mass of the surface coating layer is 80 mass % or greater.

9. The protective film according to claim 2, further comprising a primer layer on an opposite side, of the cap film, from the base material film,
   wherein the surface coating layer is in direct contact with and laminated to the surface of the base material film, and the surface coating layer contains a fluororesin or urethane resin,
   wherein the cap film is in direct contact with and laminated to the surface of the surface coating layer, and
   wherein the primer layer contains a resin selected from the group consisting of an acrylic resin, a styrene resin, a polyester resin, a urethane resin, a polyester urethane resin, and an acrylic urethane resin.

10. The protective film according to claim 1, further comprising a primer layer on an opposite side, of the cap film, from the base material film.

11. The protective film according to claim 10, wherein the primer layer contains a resin selected from the group consisting of an acrylic resin, a styrene resin, a polyester resin, a urethane resin, a polyester urethane resin, and an acrylic urethane resin.

12. The protective film according to claim 1, wherein a total thickness, in which a thickness of the release liner is not included, is from 110 to 600 μm.

13. The protective film according to claim 1, wherein the release liner is released and removed, and the protective film is adhered to a display screen of a device.

14. The protective film according to claim 1, wherein the identification information is bar codes or QR codes.

15. The protective film according to claim 1, wherein the identification information is machine-readable identification information with printed information regarding the protective film printed directly onto the cap film without a label.

* * * * *